United States Patent
Broadbent et al.

(10) Patent No.: US 7,310,957 B2
(45) Date of Patent: Dec. 25, 2007

(54) ICE MACHINE WITH REMOTE MONITORING

(75) Inventors: John Broadbent, Centennial, CO (US); Rick Herbert, Aurora, CO (US); Ed Jennings, Greenwood Village, CO (US); Randy J. Karas, Ft. Collins, CO (US); Keith Glenn Kelly, Morrison, CO (US)

(73) Assignee: Scotsman Ice Systems, Vernon Hills, IL (US)

( * ) Notice: Subject to any disclaimer, the term of this patent is extended or adjusted under 35 U.S.C. 154(b) by 823 days.

(21) Appl. No.: 10/683,580

(22) Filed: Oct. 10, 2003

(65) Prior Publication Data

US 2004/0117041 A1 Jun. 17, 2004

Related U.S. Application Data

(60) Provisional application No. 60/417,468, filed on Oct. 10, 2002.

(51) Int. Cl.
*G01K 13/00* (2006.01)
*F25B 49/00* (2006.01)
*G05D 23/00* (2006.01)

(52) U.S. Cl. .................... 62/129; 62/126; 62/127; 236/51; 236/94

(58) Field of Classification Search ............ 62/125, 62/126, 127, 128, 129, 130, 131; 236/51, 236/94; 165/11.1, 11.2
See application file for complete search history.

(56) References Cited

U.S. PATENT DOCUMENTS

| | | | |
|---|---|---|---|
| 4,628,974 A | 12/1986 | Meyer | 141/129 |
| 5,279,458 A | 1/1994 | DeWolf et al. | 236/47 |
| 5,337,253 A | 8/1994 | Berkovsky et al. | 364/479 |
| 5,408,834 A | 4/1995 | Schlosser et al. | 62/78 |
| 5,477,694 A | 12/1995 | Black et al. | 62/73 |
| 5,586,446 A | 12/1996 | Torimitsu | 62/126 |
| 5,930,771 A | 7/1999 | Stapp | 705/28 |
| 6,131,399 A | 10/2000 | Hall | 62/127 |
| 6,294,765 B1 | 9/2001 | Brenn | 219/494 |
| 6,328,881 B1 | 12/2001 | Larkner et al. | 210/87 |
| 6,381,975 B1 | 5/2002 | Tsuchikawa | 62/233 |

(Continued)

FOREIGN PATENT DOCUMENTS

WO   WO 02/065031 A1   8/2002

OTHER PUBLICATIONS

International Search Report Application No. PCT/US03/32276 dated Mar. 11, 2004.

(Continued)

*Primary Examiner*—Chen Wen Jiang
(74) *Attorney, Agent, or Firm*—Ohlandt, Greeley, Ruggiero & Perle L.L.P.

(57) ABSTRACT

A commercial ice making machine having an electronic monitoring device which captures the operating status and production history of the ice machine. The ice production history of the machine is communicated via telephony and/or the Internet on a regular recurring basis to a remote computer. The production history is used to generate invoices to the user of the ice machine, so that the user is charged based on his or her actual ice consumption. Failure of the ice machine is detected by the monitoring device and communicated immediately to a service company so that the ice machine can be repaired before the end user realizes the machine has failed.

32 Claims, 3 Drawing Sheets

U.S. PATENT DOCUMENTS

| | | |
|---|---|---|
| 6,414,301 B1 | 7/2002 | Borg, Jr. et al. ......... 250/222.1 |
| 6,432,300 B2 | 8/2002 | Larkner et al. ................ 210/87 |
| 6,453,687 B2 * | 9/2002 | Sharood et al. ............... 62/127 |
| 6,581,392 B1 | 6/2003 | Gist et al. ...................... 62/66 |
| 2001/0039804 A1 | 11/2001 | Newman et al. ............... 62/66 |
| 2002/0029575 A1 | 3/2002 | Okamoto ..................... 62/125 |
| 2002/0091594 A1 | 7/2002 | Rosenberg et al. ........... 705/28 |
| 2002/0116208 A1 | 8/2002 | Chirnomas ..................... 705/1 |
| 2002/0128932 A1 | 9/2002 | Yung et al. ................... 705/27 |

OTHER PUBLICATIONS

Supplementary Partial European Search Report Application No. PCT/US03/32276, dated Nov. 21, 2005.

* cited by examiner

US 7,310,957 B2

ICE MACHINE WITH REMOTE MONITORING

CROSS-REFERENCE TO RELATED CASES

This application claims priority to U.S. Provisional Patent Application No. 60/417,468, filed on Oct. 10, 2002.

FIELD OF THE INVENTION

The present invention relates to the field of ice machines. Specifically, the present invention relates to ice machines whose operation is monitored via electronics which in turn communicates the ice machine's operational status and ice production history to a remote computer.

BACKGROUND OF THE INVENTION

Commercial ice making machines are used in restaurants, bars, hotels, schools, stadiums, arenas, grocery stores and the like. Such machines are typically mounted on top of an ice bin or an ice dispenser that is kept full of ice by the machine.

Commercial ice making machines come in a wide variety of types and production capacities so that the customers for such machines can buy one that closely matches his or her application. Because there is such a wide array of machine choices, it is possible for an ice machine customer to minimize the amount of money he must spend on the initial purchase by picking the machine that makes just enough ice for his application. Unfortunately, this can result in an ice machine that is outgrown quickly if the owner's ice-needs increase. Because all of the major manufacturers of ice making machines offer the same wide variety of ice machine models, they all experience additional costs associated with manufacturing, stocking, selling, servicing and providing parts for a huge array of machines.

All commercial ice machines require regular maintenance. For example, manufacturers typically recommend cleaning the machines a minimum of every six months. Besides this regular maintenance, over the life of an ice machine (typically 7 to 10 years) it is not uncommon for an ice machine to break down such that the a repairman must be called to fix the machine. Typically a broken machine will be noticed when the bin runs out of ice, and does not fill back up. At this point the establishment must not only call for service, but must also go purchase ice since at this point they are completely out. They must continue to purchase ice until the machine is back up and running.

SUMMARY OF THE INVENTION

A system for monitoring the status and/or ice production of an ice making device, the system comprising: at least one detector for determining the status and/or ice production of the ice making device, thereby producing detected status and/or ice production data; a microprocessor; and a transmitter for communicating detected status and/or ice production data from the detector to the microprocessor. The system may optionally also include an additional transmitter for communicating the detected status and/or ice production data from the microprocessor to a service provider.

The service provider is at least one provider selected from the group consisting of: ice making device repair provider, ice making device manufacturer, leasing agent and ice supplier.

The transmitter and additional transmitter are at least one selected from the group consisting of: Internet, wired telephony, wireless telephony, cable, and any other device capable of communicating the status and/or ice production data from the detector to the microprocessor and/or from the microprocessor to the service provider.

The detector preferably comprises: a first sensor for determining if the ice storage bin switch is either opened or closed; a second sensor for determining if the hot gas valve is on or off; a microprocessor for determining the freeze and/or harvest times for the ice making device to freeze and/or harvest ice during an ice making freeze/harvest cycle and/or number of the freeze/harvest cycles; and a data generator which is capable of producing the status and/or ice production data. The status and/or ice production data is at least one selected from the group consisting of: freeze cycle time, harvest cycle time, count of completed freeze/harvest cycles, and ice making device fault alert. The ice making device fault alert is at least one selected from the group consisting of: freeze time exceeded the predetermined maximum freeze time limit, freeze time is less than the predetermined minimum freeze time limit, harvest time exceeded the predetermined maximum harvest time limit, or harvest time is less than the predetermined minimum harvest time limit.

The status and/or ice production data communicated to the microprocessor is at least one selected from the group consisting of: identification of the ice making device, cycle time for the ice making device to complete a freeze and/or harvest cycle, the number of cycles which the ice making device has completed during the detection period, and status of the ice making device.

The microprocessor is capable of transmitting at least one data selected from the group consisting of: identification of the ice making device, location of ice making device, owner contact information, cycle time for the ice making device to complete a freeze and/or harvest cycle, the number of cycles which the ice making device has completed during the detection period, other operation data, status of the ice making device, operational history of ice making device, identification of parts likely to be needed to repair ice making device, and probable cause of alert problem.

An additional embodiment according to the present invention pertaining to a method for monitoring the status and/or ice production of an ice making device, the method comprising: determining the status and/or ice production of the ice making device, thereby producing detected status and/or ice production data; and communicating the status and/or ice production data from the detector to a microprocessor.

Still yet another embodiment according to the present invention includes a method for monitoring an ice making device comprising a bin switch and a hot gas valve, the method comprising: determining if the bin switch is either opened or closed; determining if the hot gas valve is on or off; determining the freeze and/or harvest times for the ice making device to freeze and/or harvest ice during an ice making freeze/harvest cycle and/or determine the number of freeze/harvest cycles; and generating the status and/or ice production data.

The present invention is also directed to an electronic device which is capable of monitoring an ice making machine having a bin switch and a hot gas valve, the device comprising: a first sensor for determining if the bin switch is either opened or closed; a second sensor for determining if the hot gas valve is on or off; a microprocessor for determining the freeze and/or harvest times for the ice making device to freeze and/or harvest ice during an ice making freeze/harvest cycle and/or for determining the number of freeze/harvest cycles; and a data generator which is capable of producing the status and/or ice production data.

BRIEF DESCRIPTION OF THE DRAWINGS

A better understanding of the invention can be had by reference to the following Detailed Description in conjunction with the accompanying Drawings, wherein.

DETAILED DESCRIPTION OF THE PREFERRED EMBODIMENT

Figure 1:
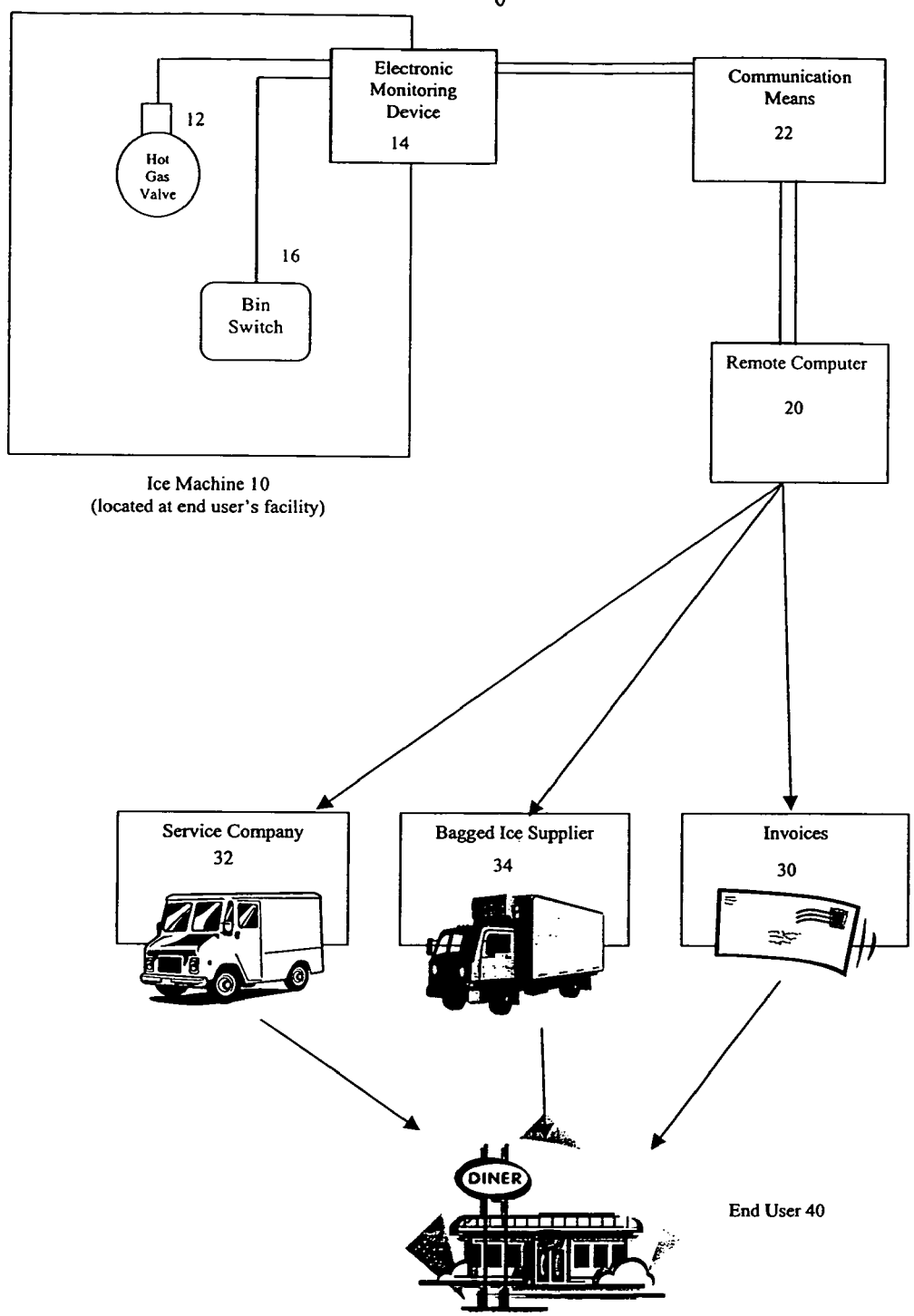
FIG. 1 is an schematic block diagram of the process according to the present invention.

The present invention is a system and method whereby a commercial ice machine's operational status and ice production is monitored by an electronic monitoring device mounted inside or near the ice machine. This monitoring device periodically communicates the ice machine's status and ice production, via a phone line, the internet, or both, to a remote computer which tracks the ice machine. The user of the monitored ice machine (e.g., a restaurant) would be charged or billed for actual ice produced, as evidenced by the monitored data, rather than buying the ice machine outright. In addition, the monitoring computer would notify a service company and a supplier of ice in the event that a failure of the monitored ice machine was detected.

The method provides a user of ice, e.g., a restaurant, bar, school or the like, with a means to have an ice machine at their facility, but only pay for the ice used. This allows the user to acquire the use of an ice machine without having a large upfront payment. It also allows the user to be assured that he is only paying for ice he's using, and not excess capacity—as he might do if he acquired a large ice machine via a traditional lease. This invention will be particularly attractive to ice users who only need ice during certain times of the week or year (e.g., stadiums, schools).

A further advantage of the present invention is that it provides a means of delivering ice to a user whereby the user does not care if the ice machine's production capacity is oversized. Typically, a user would buy an ice machine with a production capacity that is closely matched to that user's ice consumption requirements, because it is in his economic interest to do so. Buying an oversized ice machine would be an unnecessary added expense. However, because with the present invention the user only pays for ice used, the user is not concerned with the size of the ice machine, as long as it is has sufficient ice production capacity. This allows the ice machine manufacturer/provider to select the ice machine size based on the manufacturer's needs, not the users. Thus for example, the manufacturer may choose to have a smaller array of ice production capacities, since a smaller offering will result in increased manufacturing efficiencies, smaller inventory levels and will facilitate machine servicing (since fewer parts will be needed on the service trucks).

Still yet another advantage relates to a means to detect ice machine failure before it would normally be detected. As stated previously, the end user typically detects ice machine failure when the bin runs out of ice and does not refill. With a monitored ice machine, the monitoring computer could detect failure when the failure occurs, not when the bin runs out. This allows a service call to be made hours earlier than would normally be possible, mitigating the need to buy replacement ice, and minimizing or eliminating any ice shortage to the customer.

The present invention also provides the ability to monitor the amount of ice consumed by the user. This information can be used to predict when or if the user will need a larger ice machine to meet his requirements.

Furthermore, the present invention provides a means whereby the user and/or provider of the ice machine can know when, based on how much ice has been used, the machine will require service. Typically ice machine maintenance is done on a periodic basis regardless of ice used, e.g., cleaning the machine every six months. The present invention, by monitoring actual ice production and use, can be used to schedule maintenance when it's needed instead of simply when its scheduled.

Another benefit of the present invention is that it allows faster servicing of a failed ice machine. Because the operational history of the ice machine can be provided, via the monitoring computer to the service technician prior to his arrival at the machine, it is possible for the technician to have a good idea of what's wrong with the machine even before he sees it. This knowledge will speed up diagnosis of the machine and thus the service call itself. Likewise, a knowledge of the machine and its most likely problem prior to the visit will allow the technician to be thoroughly prepared, having the right parts to make the repair.

The present invention consists of a conventional ice making machine, an electronic monitoring device, a remote computer and a communication means between the computer and the monitoring device. The monitoring device is connected to components or controls inside the ice machine to allow the monitoring device to know such things as: a) if the ice machine is being requested to make ice (e.g., the ice storage bin is not full), b) how many ice making cycles have occurred, c) the duration of the ice making cycles, including the length of time for both the d) freezing portion of the cycle, and e) harvesting portion of the cycle. With this limited information, it is possible to determine how much ice the machine has made during a given time period and whether or not the machine is operating properly.

On a periodic basis, for example every night, the electronic monitoring device establishes communications with the remote computer via the communications means. It then transfers to the remote computer how many ice making cycles occurred during the prior 24 hours, and the length of the freeze and harvest cycles and when they occurred, and when the bin was full or not full. The remote computer logs this information.

Logic on board the monitoring device also causes communications with the remote computer to be established when the monitoring device detects a failure of the ice machine. The exact logic used to determine the failure will vary and depend on the size and type of ice machine monitored. In many cases, however, it is possible to detect failure simply by detecting that:

a) The machine is being requested to make ice, AND
b) The length of the freeze portion of the ice making cycle is falling outside the predetermined maximum or minimum time, OR
c) The length of the harvest portion of the ice making cycle is falling outside the predetermined maximum or minimum time.

The information gathered by the remote computer would be used in the following ways:

The information on how many ice making cycles occurred would be used as a basis for billing the user of the ice machine. For example, the ice machine user could be billed based on how many pounds of ice he or she had used in the prior month based on how many ice making cycles were recorded for that time period. By knowing how many pounds of ice are produced each ice making cycle (which is typically a known and consistent number for cube-type ice making machines), it is simply a matter of multiplication to determine how many pounds were generated by a known number of ice making cycles. The dollar amount to be billed to the customer would then be based on the pounds of ice produced and the agreed upon pricing schedule. Preparation of the customer invoices could either be done on the remote computer, or the necessary data could be communicated to a third party to do invoice preparation and delivery.

The communication from the monitoring device to the remote computer indicating a machine failure is used to immediately initiate a request to a service company to repair the ice machine. With a conventional ice machine, the need for a service call typically is not apparent until the ice bin runs empty. This wouldn't happen until many hours, and possibly days, after the failure actually occurred. Because of that time delay, a machine failure will typically result in the end user having to purchase bagged ice until the machine is back up and running and the bin refilled. By initiating the service call immediately upon detection of the failure, it is possible to fix the machine in many cases before the ice bin has been depleted, eliminating (or at least reducing) the need to purchase bagged ice.

Likewise, the failure indication can also be used to initiate a request to a provider of packaged ice to deliver ice to the failed ice machine—thus completely preventing the end user from running out of ice in the event that the machine cannot be repaired immediately.

The information provided by the monitoring device can also be used to speed the repair of the machine. The failure mode (for example the freezing cycle is too long) can be communicated to the service company before they make the service call on the machine. With this failure mode information, and optionally the operating history of the machine, the service technician will have a much better idea about what is potentially wrong with the machine, what to check for, and what parts may be needed.

The logged ice machine operating data can also be used in a number of other ways. For example, ice production histories can be used to anticipate the need for a higher-capacity ice machine before an ice shortage at the end user's facility actually occurs. Ice production history can be used by the end user to track time-of-day, day-of-week, or seasonal ice use. This information might then be used by the end user for staffing, marketing or product development purposes. Cumulative ice production data could be used to determine when routine maintenance should be scheduled for a given ice machine.

More elaborate monitoring equipment could be used to also track such things as the biological or mineral content of the ice making water, the need to service the water filters that supply the machine, or the need to replace the air filter on a machine.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, a schematic illustrating the basic components and interconnections of the present invention, a cube-type ice machine 10 is represented. Ice machines of the type that make cubes, such as ice machine 10, typically contain a device referred to as a hot gas valve 12. The hot gas valve 12 is used during the harvesting portion of an ice making cycle to direct hot refrigerant into the evaporator of the ice machine to cause the ice to be released. Thus every ice making cycle incorporates a time during which the hot gas valve 12 is energized. An electronic monitoring device 14, located in or near ice machine 10 is connected to the hot gas valve 12 in order to monitor its operation. Monitoring device 14 captures a number of relevant pieces of data about the ice machine by logging when hot gas valve 12 is energized and when it isn't. For example, the following data can be captured by monitoring the hot gas valve 12:

How long the valve 12 is energized=length of the harvest

How long valve 12 is not energize=length of freeze

Time between subsequent energizing of valve 12=length of total freeze cycle

Number of times energized per day=batches of ice produced per day

In addition to the valve 12, monitoring device 14 is also connected to bin switch 16, which is used to control when the ice machine turns off. There are a number of ways for a device such as bin switch 16 to work, for example ice machine manufacturers have used mechanical switches, thermostats, and electric eyes to accomplish the bin switch 16 function. By monitoring the status of bin switch 16, monitoring device 14 can determine if the ice machine 10 should be running or not. This information is critical in determining if the ice machine 10 is operating properly.

On some regular basis, for example daily, monitoring device 14 initiates communications with a remote computer 20. The communication is accomplished using a communication means 22. Communication means 22 can be accomplished through a number of different methods, for example, a phone line (i.e., dial-up) type connection directly to computer 20 or a phone line to an Internet connection that would be used to communicate to computer 20. Communication means 22 can be a connection to the internet using a DSL line, T1, cable internet, wireless (e.g., wi-fi) or any other suitable means to connect to the internet.

Information to be communicated on a regular basis from monitoring device 14 to computer 20 include ice production information, and ideally all the operating information monitored and logged by device 14. With that information, computer 20 can determine the amount of ice produced over any given time period by ice machine 10, and is also capable of reporting the complete usage and operational history of machine 10. As stated previously, this information is beneficial for a number of purposes, including speeding service calls, predicting the need to increase production capacity, and for the end user to better understand his usage patterns and trends.

Using the ice production data from ice machine 10, computer 20 can either generate invoices 30 that would be sent to the end user 40 or owner of ice machine 10 or transmit the production data to a third party for invoice generation. Invoices 30 charge the end user 40 for ice based on that end user's 40 actual use of ice, as evidenced by the production data from the ice machine 10. This would be the means by which the end user 40 would pay for the use of the ice machine.

In the event that monitoring device 14 detected a failure in ice machine 10, device 14 would immediately initiate communications with computer 20 via communication means 22. Device 14 would communicate to computer 20 that a failure had been detected in ice machine 10. Ideally, device 14 would also communicate to computer 20 what the mode of failure was. For example, these modes may include:

Freeze cycle too long (i.e., greater than the predetermined maximum)

Freeze cycle too short (i.e., less than the predetermined minimum)

Harvest cycle too long (i.e., greater than the predetermined maximum)

Harvest cycle too short (i.e., less than the predetermined minimum)

Device 14 may additionally communicate all performance data since the previous communication with computer 20, so that computer 20 has all the relevant performance history up until the time of failure.

At this time, communication would be initiated from the remote computer 20 to a service company 32 who would be instructed to make a service call to ice machine 10. That instruction may be done automatically by computer 20 or through some other means, for example via a human operator of computer 20. Ideally service company 32 would be provided with details available on machine 10, including the mode of failure and its recent operating history. This information would be useful in the diagnosis and repair of the machine 10. At this time, a bagged ice supplier 34 may also be contacted to provide bagged ice to the end user to insure that he does not run out of ice.

Figure 2:
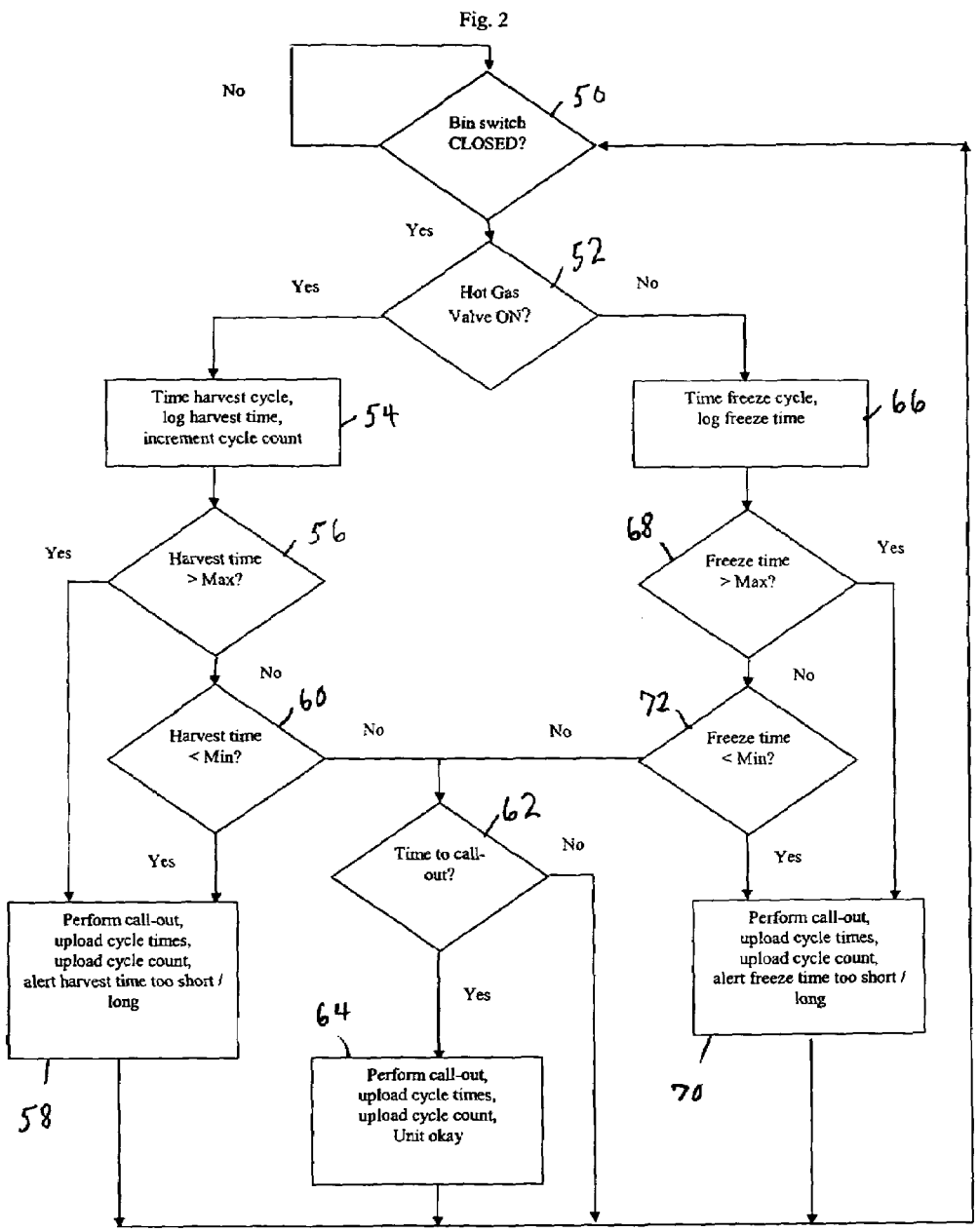
FIG. 2 is a logic flow diagram of the operation of the electronic monitoring device according to the present invention.
Figure 3:
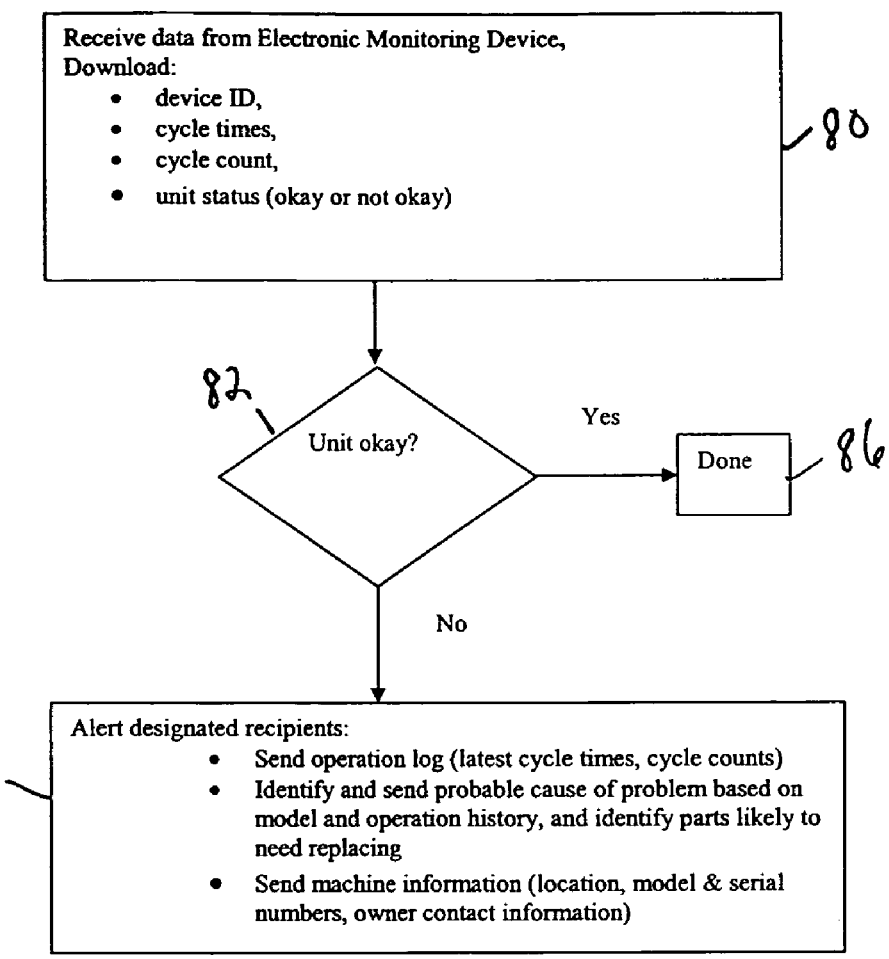
FIG. 3 is a logic flow diagram of the operation of a remote computer according to the present invention.
Figure 4:
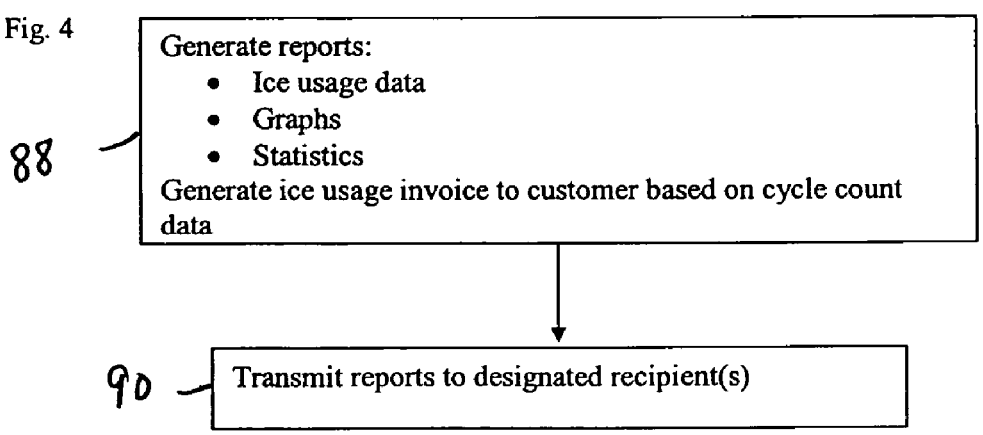
FIG. 4 is a block diagram of a period report generation scheme according to the present invention.

FIGS. 2-4 relate to various flow diagrams for controlling electronic monitoring device 14, remote computer 20 and the periodic report generator of the present invention.

Operation of Electronic Monitoring Device

The preferred operation of electronic monitoring device 14 is set forth in FIG. 2, wherein device 14 is connected to hot gas valve 12 and bin switch 16 of ice machine 10 so the operation of machine 10 can be monitored. Software within device 14 operates as shown in FIG. 2 and as described below.

During operation, device 14 would continually monitor the status 50 of bin switch 16 in order to determine if the ice machine is supposed to be running. If the ice bin (or ice dispenser) below ice machine 10 is full, then bin switch 16 will be open (typically), causing the ice machine to turn off. Thus, if switch 16 is open, the ice machine 10 should be off with no monitoring needed. Status monitor 50 will then continuously check to ensure that switch 16 is open. Conversely, if switch 16 is closed, ice machine 10 should be on and operating, and should be monitored by device 14. If status monitor 50 determines that switch 16 is 'closed', then electronic monitoring device 14 checks to determine if hot gas valve 12 is 'ON' 52.

If hot gas valve 12 is ON (energized), machine 10 is executing an ice harvesting sequence. If this is the case, device 14 will track 54 the time that valve 12 stays energized (the Harvest time), record that time into memory, and check the Harvest time to be sure its within the prescribed parameters, i.e., not longer that the predetermined MAX time, and not less than the predetermined MIN time. If the Harvest time is outside of the predetermined MAX range 56, device 14 will be instructed to immediately perform a Call-out function 58, whereby it makes a connection to remote computer 20 and uploads all data stored since the last Call-out (e.g., cycle times, cycle counts, machine ID) alert computer 20 that the Harvest time was either shorter or longer than the predetermined limits. If the Harvest time is not outside the predetermined MAX range, then it checks to see if the Harvest time is outside of the predetermined MIN range 60. If the Harvest time is outside the MIN range, then it performs Call-out function step 58. If the Harvest time is neither outside of the predetermined MAX or MIN ranges, then device 14 checks to determine if the predetermined time to call-out has been met 62. If the predetermined time to call-out has not been met, then device 14 returns to step 50 to determine again if the bin switch is 'closed'. If the predetermined time to call-out has been met, then device 14 performs call-out step 64 which uploads cycle times, uploads cycle count and indicates that the unit is okay to remote computer 20. After call-out step 64 is performed, device 14 returns to step 50 and the sequence of monitoring control steps is performed again.

If hot gas valve 12 is OFF (de-energized), and bin switch 16 is CLOSED, one can assume that machine 10 is in the freeze portion of an ice-making cycle. In this case device 14 would record the Freeze time into memory 66 and thereafter determine if the Freeze time is greater than a predetermined MAX time limit 68. If the freeze time is greater than a predetermined MAX time limit 68, then, device 14 would be instructed to immediately perform a Call-out function 70. As described above, device 14 would connect to computer 20 and upload all data stored since the last Call-out (e.g., cycle times, cycle counts, machine ID) alert computer 20 that the Freeze time was either shorter or longer than the predetermined limits. If the Freeze time is not greater than a predetermined MAX time limit 68, then the system determines if the Freeze time is below a predetermined MIN time limit 72. If the Freeze time is below the predetermined MIN time limit 72, then the device 14 would be instructed to immediately perform Call-out function 70. After performing Call-out function 70, then system returns to step 50 and starts all over. If the Freeze time is not above the predetermined MAX limit nor below the predetermined MIN limit, then device 14 will determine if it is the predetermined time and predetermined schedule to call-out 62. If it meets the predetermined time to call-out 62, then the system performs a call-out 64, including uploading of cycle times, uploading of cycle count and stating that the unit is okay. For example, it might be programmed to call-out every night at 3:00 AM or every Sunday at 1:00 AM. If the predetermined time to call-out 62 has not been met, then the system returns to step 50 and starts the monitoring of the system again.

Operation of Remote Computer

The operation of remote computer 20 is described in FIG. 3, attached hereto, wherein remote computer 20 receives communications 80 from electronic monitoring device 14 and take predetermined actions based on the information received. The communications may include a data packet having device identification, cycle times, cycle count and unit status (okay or not okay). Data may be received from device 14 via communication means 22 which may include an internet communication (e.g., email), a direct dial-up (modem) connection, wireless communication or any other communication method now known or developed in the future which is capable of transmitting such communications 80 from device 14 to remote computer 20. Data communicated to computer 20 may be, but is not limited to, the identification of the ice machine 10, a log of the freeze and harvest times recorded by device 14, a total of cycles recorded since the last communication and the status of the unit (e.g., unit okay, unit NOT okay: harvest too long, harvest too short, freeze too long or freeze too short).

The data packet or communication received by remote computer 20 is then checked to determine if it is okay 82. If the communication from step 80 includes an alert that ice machine 10 was NOT okay, remote computer 20 would transmit a notification 84 to designated service personnel alerting them to the problem and communicating the information needed. Such information would include machine information (i.e., location, model & serial number, owner contact information), the latest operating data log and suggested problems, and parts needed based on model number and failure mode. The designated service personnel could include any or all of: the owner/customer, the designated service company and/or an ice delivery service. This would allow the designated service provider to immediately visit the machine, making any needed repairs prior to the customer actually running out of ice. Alerting an ice delivery service of the machine failure would allow ice to be delivered to the machine location to insure that there was a sufficient supply of ice even if the machine could not be repaired immediately.

If the status of the ice machine 10 was "okay", then this protocol procedure is done 86 and no further action would be taken at time of data receipt.

FIG. 4 describes the periodic report generation features of the present invention. Remote computer 20 periodically generates predetermined reports 88 desired for ice machine 10. Such reports could include, but are not limited to, graphs and statistics of operating performance. The reports may also include invoices to the customer charging that customer for actual pounds of ice produced by the machine 10. Such reports may optionally be communicated or transmitted 90 to designated personnel, such as the machine owner (e.g., a leasing company), machine user/customer (e.g., a restaurant), and/or machine service provider.

What is claimed is:

1. A system for monitoring the status and/or ice production of an ice making device that comprises a hot gas valve and an ice storage bin switch, said system comprising:
   at least one detector for determining said status and/or ice production of said ice making device, thereby producing detected status and/or ice production data;
   a first microprocessor; and
   a transmitter for communicating detected status and/or ice production data from said detector to said microprocessor, wherein said detector comprises:
      a first sensor for determining if said ice storage bin switch is either opened or closed;
      a second sensor for determining if said hot gas valve is on or off;
      a second microprocessor for determining the freeze and/or harvest times for said ice making device to freeze and/or harvest ice during an ice making freeze/harvest cycle and/or the number of the freeze/harvest cycles; and
   a data generator which is capable of producing said status and/or ice production data.

2. The system according to claim 1 further comprising: an additional transmitter for communicating the detected status and/or ice production data from said first microprocessor to a service provider.

3. The system according to claim 2, wherein said service provider is at least one provider selected from the group consisting of: ice making device repair provider, ice making device manufacturer, leasing agent and ice supplier.

4. The system according to claim 2, wherein said transmitter and additional transmitter are at least one selected from the group consisting of: Internet, wired telephony, wireless telephony, cable, and any other device capable of communicating said status and/or ice production data from said detector to said first microprocessor and/or from said first microprocessor to said service provider.

5. The system according to claim 1, wherein said detector is an electronic monitoring unit.

6. The system according to claim 5, wherein said detected status data comprises at least an identification of said ice making device and said ice making devices status.

7. The system according to claim 5, wherein said ice production data comprises at least an identification of said ice making device and at least one additional parameter selected from the group consisting of: freeze/harvest cycle time and cycle count.

8. The system according to claim 1, wherein said first microprocessor is located remote from said ice making device.

9. The system according to claim 1, wherein said status and/or ice production data is at least one selected from the group consisting of: freeze cycle time, harvest cycle time, count of completed freeze/harvest cycles, and ice making device fault alert.

10. The system according to claim 9, wherein said ice making device fault alert is at least one selected from the group consisting of: when said freeze cycle time exceeds a predetermined maximum freeze cycle time limit, when the freeze cycle time is less than a predetermined minimum freeze cycle time limit, when the harvest cycle time exceeds a predetermined maximum harvest cycle time limit, and when the harvest cycle time is less than a predetermined minimum harvest cycle time limit.

11. The system according to claim 1, wherein said status and/or ice production data communicated to said microprocessor is at least one selected from the group consisting of: identification of said ice making device, cycle time for said ice making device to complete a freeze and/or harvest cycle, the number of cycles which said ice making device has completed during the detection period, and status of said ice making device.

12. The system according to claim 1, wherein said first microprocessor is capable of transmitting at least one data selected from the group consisting of: identification of said ice making device, location of ice making device, owner contact information, cycle time for said ice making device to complete a freeze and/or harvest cycle, the number of cycles which said ice making device has completed during the detection period, other operation data, status of said ice making device, operational history of ice making device, identification of parts likely to be need to repair ice making device, and probable cause of alert problem.

13. A system for monitoring the status and/or ice production of an ice making device, said system comprising:
   at least one detector for determining said status and/or ice production of said ice making device, thereby producing detected status and/or ice production data;
   a microprocessor; and
   a transmitter for communicating detected status and/or ice production data from said detector to said microprocessor, wherein said microprocessor is capable of generating an invoice or having an invoice generated based upon said detected status and/or ice production data.

14. The system according to claim 13, wherein said invoice comprises at least one charge selected from the group consisting of: ice making device repair service charge, bagged ice charges and ice production charge.

15. The system of claim 13, wherein said invoice is based on a count of freeze/harvest cycles of said ice making device.

16. A method for monitoring the status and/or ice production of an ice making device that comprises a hot gas valve and an ice storage bin switch, said method comprising:
   determining said status and/or ice production of said ice making device, thereby producing detected status and/or ice production data; and
   communicating said status and/or ice production data from said detector to a microprocessor, wherein said determining step comprises:
      determining if said ice storage bin switch is either opened or closed;
      determining if said hot gas valve is on or off;
      determining the freeze and/or harvest times for said ice making device to freeze and/or harvest ice during an ice making freeze/harvest cycle and/or the number of the freeze/harvest cycles; and
      generating said status and/or ice production data.

17. The method according to claim 16 further comprising communicating the said status and/or ice production data from said microprocessor to a service provider.

18. The method according to claim 17, wherein said service provider is at least one provider selected from the group consisting of: ice making device repair provider and ice supplier.

19. The method according to claim 17, wherein said communicating steps are at least one selected from the group consisting of: Internet, wired telephony, wireless telephony, cable, and any other device capable of communicating said status and/or ice production data from said detector to said microprocessor and/or from said microprocessor to said service provider.

20. The method according to claim 16, wherein said determining said status step is performed by an electronic monitoring unit.

21. The method according to claim 20, wherein said status data comprises at least an identification of said ice making device and said ice making devices status.

22. The method according to claim 20, wherein said ice production data comprises at least an identification of said ice making device and at least one additional parameter selected from the group consisting of: freeze/harvest cycle time and cycle count.

23. The method according to claim 16, wherein said microprocessor is located remote from said ice making device.

24. The method according to claim 16, wherein said status and/or ice production data is at least one selected from the group consisting of: freeze cycle time, harvest cycle time, count of completed freeze/harvest cycles, and ice making device fault alert.

25. The method according to claim 24, wherein said ice making device fault alert is at least one selected from the group consisting of: when the freeze cycle time exceeds a predetermined maximum freeze cycle time limit, when the freeze cycle time is less than a predetermined minimum freeze cycle time limit, when the harvest cycle time exceeds a predetermined maximum harvest cycle time limit, and when the harvest cycle time is less than a predetermined minimum harvest cycle time limit.

26. The method according to claim 16, wherein said status and/or ice production data communicated to said microprocessor is at least one selected from the group consisting of: identification of said ice making device, cycle time for said ice making device to complete a freeze and/or harvest cycle, the number of cycles which said ice making device has completed during the detection period, and status of said ice making device.

27. The method according to claim 16, wherein said microprocessor is capable of transmitting at least one data selected from the group consisting of: identification of said ice making device, location of ice making device, owner contact information, cycle time for said ice making device to complete a freeze and/or harvest cycle, the number of cycles which said ice making device has completed during the detection period, other operation data, status of said ice making device, operational history of ice making device, identification of parts likely to be need to repair ice making device, and probable cause of alert problem.

28. A method for monitoring the status and/or ice production of an ice making device, said method comprising:
   determining said status and/or ice production of said ice making device, thereby producing detected status and/or ice production data; and
   communicating said status and/or ice production data from said detector to a microprocessor; and
   generating an invoice or having an invoice generated based upon said status and/or ice production data from said microprocessor.

29. The method according to claim 28, wherein said invoice comprises at least one charge selected from the group consisting of: ice making device repair service charge, bagged ice charges and ice production charge.

30. The method of claim 28, wherein said invoice is based on a count of freeze/harvest cycles of said ice making device.

31. A method for monitoring an ice making device comprising a bin switch and a hot gas valve, said method comprising:
   determining if said ice storage bin switch is either opened or closed;
   determining if said hot gas valve is on or off;
   determining the freeze and/or harvest times for said ice making device to freeze and/or harvest ice during an ice making freeze/harvest cycle and/or the number of the freeze/harvest cycles; and
   generating said status and/or ice production data.

32. An electronic device which is capable of monitoring an ice making machine having a bin switch and a hot gas valve, said device comprising:
   a first sensor for determining if said ice storage bin switch is either opened or closed;
   a second sensor for determining if said hot gas valve is on or off;
   a microprocessor for determining the freeze and/or harvest times for said ice making device to freeze and/or harvest ice during an ice making freeze/harvest cycle and/or the number of the freeze/harvest cycles; and
   a data generator which is capable of producing said status and/or ice production data.

* * * * *